April 21, 1970     R. ARONSON     3,507,348

IONIZING APPARATUS FOR REDUCING AIR RESISTANCE

Filed Feb. 16, 1968

INVENTOR
ROBERT ARONSON

BY *Cushman, Darby & Cushman*
ATTORNEYS

United States Patent Office 3,507,348
Patented Apr. 21, 1970

3,507,348
IONIZING APPARATUS FOR REDUCING AIR RESISTANCE
Robert Aronson, Ferndale, Mich., assignor to Electric Fuel Propulsion, Incorporated, Ferndale, Mich., a corporation of Delaware
Filed Feb. 16, 1968, Ser. No. 706,159
Int. Cl. B60v 18/00
U.S. Cl. 180—65    12 Claims

ABSTRACT OF THE DISCLOSURE

Apparatus which ionizes the air surrounding a vehicle in order to reduce wind or air resistance. In one embodiment this ionization is accomplished by rotating electromagnets mounted on a disk atop the vehicle. The disk may be rotated by battery power or through the motion of the vehicle via its wheels or an added small wheel in contact with the ground communicated through a plurality of gears.

DESCRIPTION OF THE PRIOR ART AND SUMMARY OF THE INVENTION

This invention relates to a vehicle which moves relative to the air and includes means to ionize a portion of the air surrounding the vehicle, thereby reducing wind resistance.

This invention is particularly useful in connection with vehicles which are driven by electric motors, most of which carry a rechargeable source of electrical energy. However, the invention is not limited to vehicles which move along the ground on wheels or any particular type of vehicle, and is useful in conserving energy by reducing energy losses, in any type of vehicle. The invention finds utility with any type of vehicle which must overcome wind resistance.

Around the beginning of the twentieth century, three types of automobiles were locked in a fierce competition for the fledgling automobile market, the steam automobile, the electric automobile and the gasoline automobile. The gasoline automobile emerged the victor and has since grown to be the center of an enormous industry, and indeed an entire way of life. The problems which caused the electric automobile then to wall behind have still not yet been completely overcome. The weight, range, speed and acceleration of most such electric vehicles, although improved somewhat, is still less than entirely competitive with gasoline automobiles. However, the virtues of the electric automobile, such as quietness, lack of waste pollutants and inexpensive operation, are such that, even with its drawbacks, the electric automobile is beginning to carve a niche in the enormous automobile market.

The drawbacks have been mitigated somewhat by the use of improved conventional lead acid storage batteries as well as radically different storage batteries. In addition, techniques have been developed for conserving what energy is available within the storage batteries and for utilizing that energy as efficiently as possible. One such technique involved apparatus for recovering a portion of kinetic energy of the vehicle which would otherwise be dissipated in braking by regeneratively braking the vehicle and is described in my patent application entitled "Regenerative System for Electric Vehicles," application Ser. No. 693,433, filed Dec. 26, 1967, the disclosure of which is hereby incorporated herein. Another technique for conserving energy by decreasing the weight of the vehicle by forcing air through the vehicle to form a cushion of air which partially supports the vehicle is described in another patent application of mine entitled "Air Supported Electric Vehicle," application Ser. No. 706,157, filed Feb. 16, 1968 concurrently herewith, and the disclosure of which is hereby incorporated herein. This invention relates to yet another technique for conserving energy whereby the air surrounding the vehicle is ionized.

A good portion of the energy required to propel any vehicle is used to overcome the resistance of the air. The air must be displaced by the vehicle, pushed aside, and this requires energy. The air creates friction between itself and all of the exterior surfaces of the vehicle, and to overcome this requires energy. The air itself can move, buffeting and impeding the vehicle, and this air movement requires energy to overcome.

The present invention reduces the amount of energy which must be used thus against the air itself by ionizing the air around a portion of the vehicle. In one embodiment ionization is accomplished by the rotation of a plurality of electromagnets mounted atop the vehicle. While the precise cause of ionization for this embodiment is not known, the changing magnetic field in the vicinity of the rotating electromagnet is thought to induce an electric field which causes ionization of the air.

These electromagnets may be mounted on a disk which is rotated by a vertical shaft which is in turn rotated whenever the vehicle is in motion. This rotating disk then resembles a windmill. The shaft is rotated by gears which are in turn driven by a small drop wheel which is in contact with the ground and rotates as the vehicle moves along the ground.

This reduction of wind resistance which results from the present invention reduces the load on the motor and conserves the energy source—batteries or gasoline, or any other source which the vehicle carries. Thus, the life and efficiency of the vehicle are increased as are the range and speed.

Other objects and purposes will become clear after reading the following detailed description of the drawing.

DETAILED DESCRIPTION OF THE DRAWING

Figure 1:
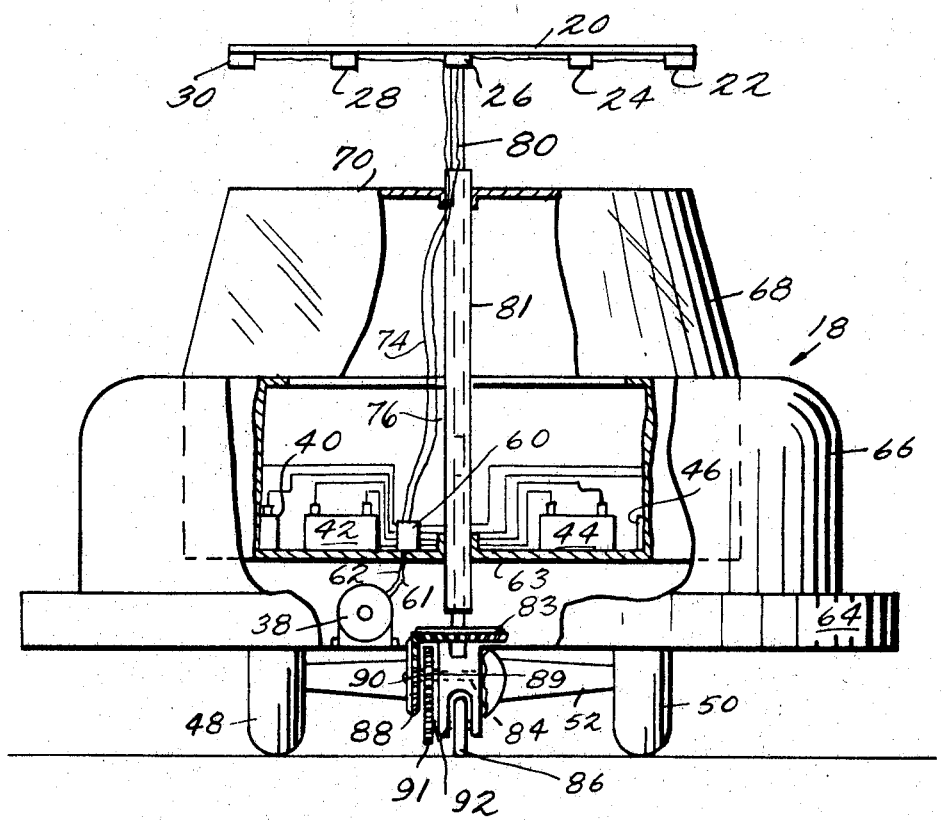
FIGURE 1 shows a cutaway view of one embodiment of the invention with a disk adapted to rotate mounted atop the vehicle.
Figure 2:
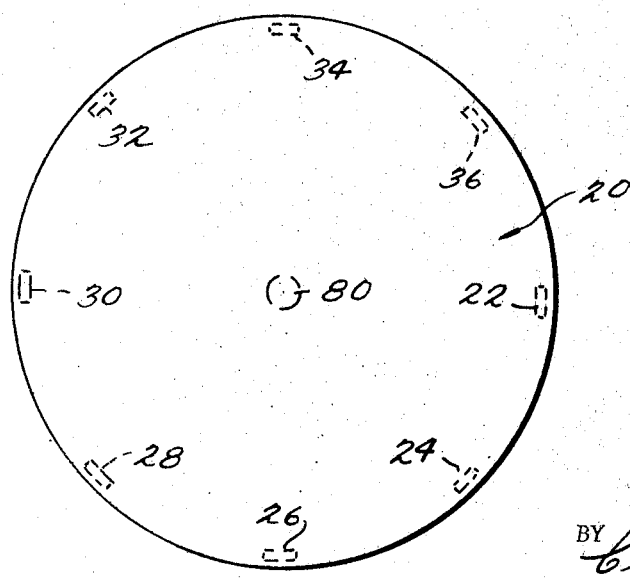
FIGURE 2 shows a view of the rotating disk of FIGURE 1 shown from the top.

Reference is now made to FIGURE 1, which shows one embodiment whereby a vehicle 18 which moves along the ground is adapted so that a portion of the air surrounding the vehicle 18 is ionized as a disk 20, resembling a windmill and having a plurality of magnets 22, 24, 26, 28, 30, 32, 34 and 36 mounted upon it, rotates and to FIGURE 2 which shows a top view of the disk 20. The number of electromagnets is illustrative only; more could be added or subtracted, as desired. In this embodiment, the means for propelling the vehicle 18 is assumed to be an electric motor 38 which is normally excited from storage batteries 40, 42, 44 and 46. The motor could be located in another position from that shown which is merely illustrative. The invention, however, is not intended to be limited to any particular means of propelling the vehicle 18 or indeed to any particular type of vehicle. The invention finds utility with any type of vehicle which moves through the air, including vehicles which move along the ground on four wheels as well as those which move through the air above the ground. Neither are the structural features of the particular vehicle 18 shown in FIGURE 1 considered any particular limitation. The invention is readily adaptable to vehicles of diverse shapes and structures.

The wheels 48 and 50, which are for the purposes of illustration assumed to be the rear wheels, are driven through an axle 52 by the electric motor 38. The batteries 40, 42, 44 and 46 furnish energy to excite the motor 38 and may be connected in a number of parallel and serial arrangements by a control mechanism 60, for example, in response to commands issued by the driver through the accelerator control pedal (not shown). The chosen voltage is communicated to the motor 38 from control mechanism 60 through wires 61 and 62. The operation of such a control mechanism 60 is described more fully in connection with my above-mentioned application Ser. No. 693,433, entitled "Regenerative System for Electric Vehicles," filed Dec. 26, 1967.

The control mechanism 60, as well as the batteries 40, 42, 44 and 46, are shown resting upon a battery platform 63 which is shown in this embodiment as a cylindrical hollow open-ended container having the center of the vehicle 18 as its axis. It is not, of course, necessary that the platform 63 be located in any particular position in the vehicle or have any particular structure, and it may be situated to serve whatever purposes are necessary.

The particular vehicle 18 shown in FIGURE 1 is substantially round and is girded by a circular bumper 64 which may be attached to the vehicle 18 in a number of ways. For example, a number of spokes could connect the bumper 64 to the housing 66 or to a central hub (not shown) or the bumper 64 could simply be attached to a circular solid metal disk which could also serve as the floor of the vehicle. The vehicle is also equipped with a metallic roof 70 and a wraparound window 68 through which the driver can see.

In this particular embodiment, the ionization of the air is accomplished by whirling a solid disk 20 upon which is mounted a number of electromagnets 22, 24, 26, 28, 30, 32, 34 and 36. In this embodiment, the electromagnets are energized by the batteries 40, 42, 44 and 46 via two wires 74 and 76 which run from the control mechanism 50 and allow current to pass serially through each of the electromagnets. Alternatively a separate source may be included for that purpose and any suitable means of energizing the electromagnets can be used. Permanent magnets may also be used in place of or in combination with the electromagnets.

The invention is not intended to be limited to any particular means of ionization. Other means of ionizing the air, such as radiation, X-ray, ultraviolet light, electric fields or heating may also find utility and the invention contemplates these methods as well as any other methods of ionizing the air. Neither is the specific embodiment whereby ionization is accomplished by magnets intended to be limited to a disk whirling magnet. Each of the magnets could be alternatively attached to a single fan blade which would rotate it. Also, the magnets could just as well be located atop the disk 20 as below it. Furthermore, although locating the magnets on the perimeter of the disk 20 affords maximum velocity, the magnets could also be located on other locations of the disk as desired.

In the particular embodiment of FIGURES 1 and 2, the disk 20 is rotated whenever the vehicle 18 moves along the surface of the earth. The disk 20 is attached to a vertical shaft 80 by a connection (not shown) which may be of any suitable type. The shaft 80 passes through the roof 70 and is mounted in a suitable shaft holder 81 which allows the shaft to freely rotate. The shaft 80 which turns the disk is attached to a horizontal gear 82 and journaled in a stationary support 84 which also supports the small wheel 86 which, in this embodiment, is located near the center of the vehicle 18. The horizontal gear 82 meshes with a vertical gear 88 which is driven by another vertical gear 89 which is located on the same shaft 90. The gear 89 is rotated by yet another small vertical gear 91 which connects directly to the small wheel 86 via a shaft 92 so that the gear 91 turns whenever the small wheel 86 rotates and communicates the rotary motion to the vertical shaft 80. The result is that the speed of rotation of the shaft 80 is a function of the speed of the vehicle 18. Hence, the velocity of the magnets 22, 24, 26, 28, 30, 32, 34 and 36 mounted on the disk 20 is a function of the speed of the vehicle 18.

Alternatively, the shaft 80 might be driven directly by the motor 38 through gears in the same manner as the small wheel 86 or by any other suitable means. In an arrangement where the motor 38 drives the shaft 80 the speed of rotation of the shaft 80 would be a function of the speed of the motor 38 instead of the vehicle 18. Of course, even with the arrangement shown in FIGURE 1 the motor 38 drives the shaft 80 indirectly since energy must be expended to drag the wheel 86 along the ground.

The shaft 80 may be disconnected from the small wheel 86 by simply backing the shaft 80 upwards so that the gears 82 and 88 do not mesh or by any other suitable means. For example, a clutch assembly on the shaft 80 might engage or disengage the disk 20. The small wheel 86 might also be drawn upwards out of contact with the ground.

The shaft 80 may be located in any convenient position on the vehicle 18 but in this embodiment it has been located in the center of the vehicle 18. The shaft 80 may also be used in connection with the invention described in my concurrently filed, aforementioned application entitled "Air Supported Electric Vehicle," Ser. No. 706,157. The present invention, of course, may be used by itself as well as in combination with that invention.

The invention is not intended to be limited to use with any particular type of vehicle and is not intended to be limited to any particular air ionization means.

What I claim is:

1. In a vehicle which moves relative to the air, the improvement comprising air resistance reduction means including magnetic means mounted adjacent and exterior to said vehicle so as to move relative to both said vehicle and the air surrounding said vehicle for ionizing at least a portion of said air surrounding said vehicle.

2. An improvement as in claim 1 wherein said magnetic means includes a plurality of magnets.

3. An improvement as in claim 2 wherein said magnetic means includes a coil of wire through which electrical current is adapted to pass, and a source of electrical potential for supplying current to said coil.

4. An improvement as in claim 3 wherein said ionizing means includes a disk adapted to rotate said magnetic means and wherein said magnetic means is mounted on said disk for rotation therewith.

5. An improvement as in claim 4 wherein said disk is mounted atop said vehicle.

6. An improvement as in claim 5 wherein said disk is adapted to rotate when said vehicle is in motion.

7. An air resistance reduction system for an electric vehicle of the type having a body supported by a plurality of wheels and an electric motor for rotating said wheels to move said vehicle, comprising:
   a disk mounted atop said vehicle,
   a vertical shaft attached to said disk adapted to be rotated to cause said disk to rotate when said vehicle is in motion, and
   a plurality of electromagnets spacedly mounted on said disk to rotate therewith for ionizing the air adjacent said vehicle and thereby reducing the resistance of that air surrounding said disk.

8. A system as in claim 7 including a wheel adapted to contact the ground and to rotate when said vehicle is in motion to cause said shaft to rotate.

9. A land vehicle for moving along the surface of the earth and through the air comprising:
   means for propelling said vehicle along said surface and through said air,
   a plurality of magnets mounted exterior to said vehicle, and means mechanically connecting said magnets to said propelling means for causing said magnets to move in a closed path exterior to said vehicle and to ionize at least a portion of the air surrounding said vehicle so as to reduce wind resistance.

10. A vehicle as in claim 9 wherein said magnets are electromagnets and including means for supplying electrical energy to said electromagnets.

11. A vehicle as in claim 10 wherein said supplying means includes at least a single battery and said propelling means includes an electric motor connected to said battery.

12. A vehicle as in claim 9 wherein said connecting means includes means for mounting said magnets, a shaft connected to said mounting means so as to rotate said mounting means and said magnets when said shaft is rotated, a wheel connected to said shaft so as to cause said shaft to rotate when said wheel is rotated, and means for moving said wheel into contact with said surface so that said wheel rotates when said vehicle is in motion.

References Cited
UNITED STATES PATENTS

| | | |
|---|---|---|
| 981,646 | 1/1911 | Harvey. |
| 1,665,578 | 4/1928 | Becker _____ 46—204 |
| 1,984,159 | 12/1934 | Schwedenberg et al. ____ 317—4 |
| 2,102,527 | 12/1937 | Hadley _____ 317—262 X |
| 2,333,975 | 11/1943 | Bennett _____ 317—4 X |
| 3,240,994 | 3/1966 | Stuetzer _____ 317—262 X |
| 3,300,894 | 1/1967 | Glass et al. _____ 46—204 X |

LEO FRIAGLIA, Primary Examiner

M. L. SMITH, Assistant Examiner

U.S. Cl. X.R.

180—1; 317—4; 335—219